(12) United States Patent
Belot et al.

(10) Patent No.: US 9,264,076 B2
(45) Date of Patent: Feb. 16, 2016

(54) SIGNAL GENERATION DEVICE

(71) Applicants: STMICROELECTRONICS SA, Montrouge (FR); INSTITUT POLYTECHNIQUE DE BORDEAUX, Talence (FR); CENTRE NATIONAL DE LA RECHERCHE SCIENTIFIQUE, Paris (FR); UNIVERSITE DE BORDEAUX, Bordeaux (FR)

(72) Inventors: Didier Belot, Rives (FR); Yann Deval, Bordeaux (FR); Francois Rivet, Talence (FR)

(73) Assignees: STMICROELECTRONICS SA, Montrouge (FR); INSTITUT POLYTECHNIQUE DE BORDEAUX, Talence (FR); CENTRE NATIONAL DE LA RECHERCHE SCIENTIFIQUE, Paris (FR); UNIVERSITE DE BORDEAUX, Bordeaux (FR)

( * ) Notice: Subject to any disclaimer, the term of this patent is extended or adjusted under 35 U.S.C. 154(b) by 0 days.

(21) Appl. No.: 14/177,371

(22) Filed: Feb. 11, 2014

(65) Prior Publication Data
US 2014/0233671 A1    Aug. 21, 2014

(30) Foreign Application Priority Data
Feb. 15, 2013    (FR) ...................................... 13 51308

(51) Int. Cl.
*G06F 1/04*     (2006.01)
*H03K 3/00*    (2006.01)
*H04B 1/00*    (2006.01)
(Continued)

(52) U.S. Cl.
CPC .............. *H04B 1/0014* (2013.01); *H04B 1/406* (2013.01); *H04B 2001/0491* (2013.01)

(58) Field of Classification Search
CPC .. G06F 1/04–1/10; H04B 1/0014; H04B 1/21
USPC ................... 327/291–294, 298–299; 375/295
See application file for complete search history.

(56) References Cited

U.S. PATENT DOCUMENTS

| 4,404,529 | A  | * | 9/1983  | Rossum et al. ................ 330/303 |
| 7,286,811 | B2 | * | 10/2007 | Kral .............................. 455/333 |
| 8,693,961 | B2 | * | 4/2014  | Oliaei et al. ............... 455/114.2 |

(Continued)

FOREIGN PATENT DOCUMENTS

| EP | 2557686 A2 | 2/2013 |
| WO | 2008152322 | 12/2008 |

OTHER PUBLICATIONS

French Search Report and Written Opinion dated Oct. 28, 2013 from French Application No. 13/51308.
(Continued)

*Primary Examiner* — Sibin Chen
*Assistant Examiner* — Metasebia Retebo
(74) *Attorney, Agent, or Firm* — Allen, Dyer, Doppelt, Milbrath & Gilchrist, P.A.

(57) ABSTRACT

A device for generating a signal, including: a balun; and a circuit capable of summing up, on a first access terminal of the balun, currents representative of signals received on first input terminals of the device, and on a second access terminal of the balun, currents representative of signals received on second input terminals of the device.

9 Claims, 3 Drawing Sheets

(51) Int. Cl.
*H04B 1/403* (2015.01)
*H04B 1/04* (2006.01)

(56) References Cited

U.S. PATENT DOCUMENTS

2012/0295565 A1 11/2012 Goodman
2013/0259152 A1* 10/2013 Simon et al. .................. 375/295
2014/0235186 A1 8/2014 Belot

OTHER PUBLICATIONS

Rivet et al. "65nm CMOS Circuit design of a sampled analog signal processor dedicated to RF applications", Circuits and Systems and TAISA Conference, 2008, NEWCAS-TAISA 2008, 2008 Joint 6th International IEEE Northeast Workshop on Jun. 22-25, 2008, pp. 233-236.

* cited by examiner

SIGNAL GENERATION DEVICE

CROSS REFERENCE TO RELATED APPLICATIONS

This application claims priority to French Patent Application No. 13/51308, filed Feb. 15, 2013, which is hereby incorporated by reference to the maximum extent allowable by law.

BACKGROUND

1. Technical Field

The present disclosure relates to the field of wireless communications, and more specifically aims at methods and devices for transmitting radio frequency signals.

2. Discussion of the Related Art

FIG. 1 is a simplified block diagram of a radio frequency signal transceiver device 100 where the processing of the radio frequency signals is of essentially digital nature.

Device 100 comprises an antenna 102 and a digital signal processor 104 (DSP) for example comprising a microprocessor. In the receive direction, the analog signal received by antenna 102 crosses a low-noise amplifier 106 (LNA), and is then directly converted into a digital signal by an analog-to-digital converter 108 (ADC) having its output connected to an input of digital processor 104. The basic signal processing operations, and especially carrier demodulation operations, are digitally carried out by device 104. In the transmit direction, device 104 directly generates a digital signal having the shape of a carrier wave modulated by the data to be transmitted, ready to be transmitted over the network. This signal is simply converted into an analog signal by a digital-to-analog converter 110 (DAC) placed at the output of device 104, and then amplified by a power amplifier 112 (PA), before being transmitted by antenna 102.

This type of device is sometimes called "radio software" since the processings implemented by the receiver and by the transmitter are essentially software in nature.

An advantage of such a device is that it is sufficient to reprogram the software part to make the device compatible with new communication standards (new carrier frequencies, new modulations, etc.).

However, in practice, the use of transceiver devices of purely software nature often may not be considered since this may require extremely fast converters and a digital processor capable of providing considerable computing power. Indeed, present communication standards use carrier frequencies on the order of a few GHz. To be able to process such signals in real time, the bandwidth of the converters and of the calculation device should be at least equal to 10 GHz. Further, to have satisfactory signal quality, a sampling over at least 16 bits should generally be provided. Converters and calculation devices capable of fulfilling such constraints have a considerable power consumption, conventionally ranging from 500 to 1,000 watts. Such a power consumption is incompatible with most network equipments, and in particular with portable terminals.

FIG. 2 is a simplified block diagram of a radio frequency signal transceiver device 200, illustrating a solution which has been provided to decrease the constraints on converters and on the signal digital processor.

On the receive chain side, device 200 comprises the same elements as device 100 of FIG. 1, and further comprises a device 202 (SASP—Sampled Analog Signal Processor) for pre-processing the analog signal, arranged between the output of low-noise amplifier 106 and the input of analog-to-digital converter 108. Device 202 is configured to perform an analog pre-processing of the signal, enabling to lower the operating frequency to be able to return to conditions compatible with low power consumption conversion and digital processing devices. Functionally, device 202 selects a frequency envelope (or several envelopes in the case of a multi-standard terminal) of the signal received by antenna 102, and lowers the frequency of the signal contained in this envelope. To achieve this, device 202 comprises a sampling circuit capable of delivering analog samples of the input signal, and a processing circuit capable of performing a discrete Fourier transform processing on the signal samples and of delivering first intermediate analog samples. Device 202 further comprises a processing circuit capable of modifying the spectral distribution of the first intermediate samples and of delivering second intermediate analog samples, and a processing circuit capable of performing an inverse discrete Fourier transform on the second intermediate samples and of delivering analog samples of an output signal having a lower frequency than the input signal. Detailed examples of embodiment of device 202 are described in patent application WO 2008/152322 and in article "65 nm CMOS Circuit Design of a Sampled Analog Signal Processor dedicated to RF Applications" by François Rivet et al.

The receive chain of device 200 has the advantage of providing a particularly advantageous rapidity and consumed power saving, especially in mobile telephony applications, while allowing a multistandard use and being easily reconfigurable in case of a modification of a communication standard or in case of the occurrence of a new standard.

On the transmit chain side, device 200 comprises conventional means for modulating a carrier signal with digital data. In the shown example, device 200 can alternately or simultaneously transmit data on two carrier waves P1 and P2 having different frequencies. Carrier signals P1 and P2 are respectively generated by a wave generator 204 and by a wave generator 206. Each wave generator for example comprises a voltage-controlled oscillator controlled by a quartz. A first modulator 205, for example comprising a multiplier, receives on the one hand signal P1 provided by generator 204, and on the other hand a bit train D1 of data to be transmitted provided by digital processor 104. Modulator 205 generates a signal P1' corresponding to carrier P1 modulated by data D1 to be transmitted. A second modulator 207, for example comprising a multiplier, receives on the one hand signal P2 provided by generator 206, and on the other hand a bit train D2 of data to be transmitted provided by digital processor 104. Modulator 207 generates a signal P2' corresponding to carrier P2 modulated by data D2 to be transmitted. Signals P1' and P2' are added by an adder 208, and the resulting signal is amplified by power amplifier 112, and then emitted by antenna 102.

The transmit chain of device 200 is fast and saves consumed power but has the disadvantage of not being easily reconfigurable in case of a modification of communication standards or in the case where new standards appear.

In the example of FIG. 2, the transmit chain of device 200 further comprises a counter-feedback loop enabling to verify that the signal transmitted by antenna 102 comprises no error. The counter-feedback loop comprises a coupler 210 which samples a portion of the output signal of power amplifier 112 (signal transmitted by antenna 102). The signal sampled by coupler 210 crosses a low-noise amplifier 212 (LNA) and a demodulation and digitization circuit 214. The digitized signal provided by circuit 214 is sent to digital processor 104, which verifies whether the signal actually coincides with that which was desired to be transmitted.

The provision of the counter-feedback loop, which actually corresponds to a simplified receive chain arranged in parallel with the main receive chain, has the disadvantage of increasing the bulk, the cost, and the power consumption of the device.

Another disadvantage is that circuit 214 generally comprises, for each communication standard capable of being used in transmit mode, a specific analog hardware demodulator. Circuit 214 is thus not easily reconfigurable in the case of a modification of communication standards.

SUMMARY

Thus, an embodiment provides methods and devices for transmitting radio frequency signals at least partly overcoming some of the disadvantages of known methods and devices for transmitting radio frequency signals.

A first embodiment provides a device for generating a radio frequency signal capable of operating according to one or several communication standards, and easily reconfigurable in the case where a standard should be modified or where a new standard should appear.

Another embodiment provides a device for transmitting a radio frequency signal, comprising means for verifying the integrity of the transmitted signal.

A second embodiment provides a device capable of summing up analog periodic input signals by assigning a weighting coefficient to each of them.

Thus, an embodiment provides a device for generating a signal, comprising: a balun; and a circuit capable of summing up, on a first access terminal of the balun, currents representative of signals received on first input terminals of the device and, on a second access terminal of the balun, currents representative of signals received on second input terminals of the device.

According to an embodiment, the circuit comprises a plurality of parallel branches, each comprising a controllable current source and a pair of switches connecting the current source respectively to the first and second access terminals of the balun.

According to an embodiment, the device further comprises a selection circuit configured so that two switches of a same pair are not simultaneously controlled.

According to an embodiment, the switches of each pair are respectively connected, via the selection circuit, to one of the first input terminals of the device, and to one of the second input terminals of the device.

According to an embodiment, the first input terminals are intended to receive first periodic A.C. signals, and the second input terminals are intended to receive the complementaries of the first signals.

According to an embodiment, the device comprises a plurality of third input terminals respectively connected to the control terminals of the controllable current sources.

According to an embodiment, the third input terminals are intended to receive voltages representative of weighting coefficients to be applied to the currents representative of the signals received on the first and second input terminals.

According to an embodiment, the balun comprises a first winding between the first and second access terminals, an intermediate point of the first winding being connected to a reference voltage terminal.

According to an embodiment, the balun further comprises a second winding between an output terminal of the device and a reference voltage terminal.

According to an embodiment, the device is capable of generating a radio frequency signal.

The foregoing and other features and advantages will be discussed in detail in the following non-limiting description of specific embodiments in connection with the accompanying drawings.

BRIEF DESCRIPTION OF THE DRAWINGS

For clarity, the same elements have been designated with the same reference numerals in the different drawings.

DETAILED DESCRIPTION

Figure 3:
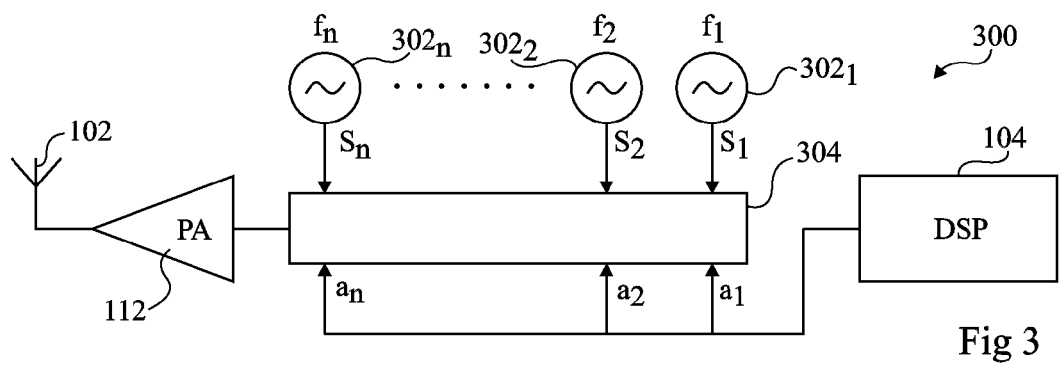
FIG. 3 is a simplified block diagram illustrating the operation of an embodiment of a radio frequency signal transmit device.

FIG. 3 is a simplified block diagram illustrating the operation of an embodiment of a device 300 for transmitting radio frequency signals, capable of being easily reconfigured in the case where a communication standard should be modified or where one or several new standards should appear.

Figure 1:
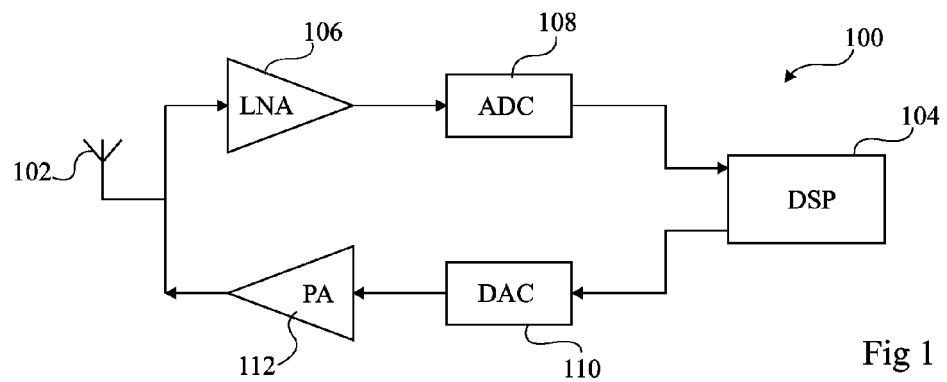
FIG. 1, previously described, is a simplified block diagram illustrating the operation of a radio frequency signal transceiver device.
Figure 2:
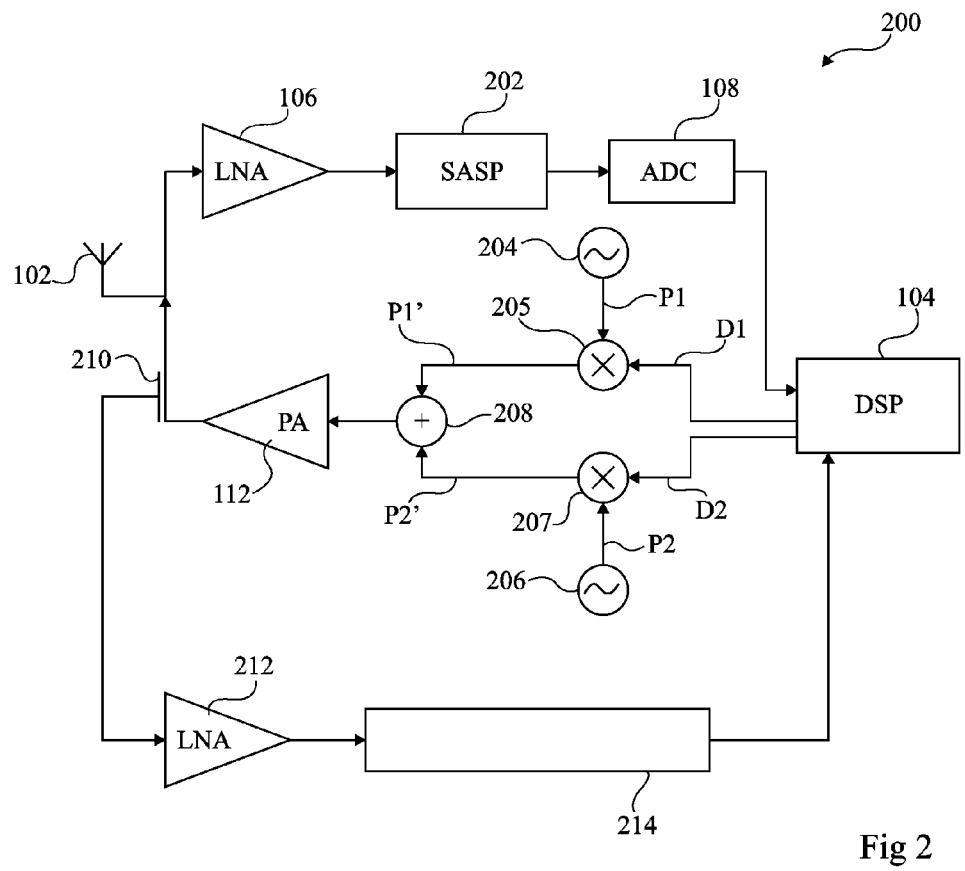
FIG. 2, previously described, is a simplified block diagram illustrating the operation of another radio frequency signal transceiver device.

Like devices 100 of FIGS. 1 and 200 of FIG. 2, device 300 comprises an antenna 102, and a device 104 for digitally processing the signal for example comprising a microprocessor. Device 300 further comprises means for generating a range of a plurality of analog periodic basic signals of different frequencies. In the shown example, device 300 comprises n periodic signal generators (n being an integer greater than 1) bearing references $302_1$ to $302_n$. Each generator $302_i$ (with i ranging from 1 to n) provides a periodic signal $S_i$ of frequency $f_i$, for example, a sinusoidal signal or a square signal. Each generator $302_i$ for example comprises a voltage-controlled oscillator, controlled by a reference source which may comprise a quartz, by means of a phase-locked loop. Device 300 further comprises a circuit 304 capable of performing a weighted sum of the n periodic signals $S_i$ in the range, by assigning a weighting coefficient $a_i$ to each of them. In the shown example, device 304 comprises n inputs connected to generators $302_1$ to $302_n$ and intended to respectively receive the n signals $S_1$ to $S_n$ in the range, and further comprises n inputs connected to the output of digital processing device 104 and intended to respectively receive the n weighting coefficients $a_1$ to $a_n$ to be assigned to signals $S_1$ to $S_n$. Digital-to-analog converters, not shown, may be provided between the output of device 104 and inputs $a_1$ to $a_n$ of device 304. The output of circuit 304 is connected to antenna 102, for example, via a power amplifier 112.

When the range of basic signals contains a sufficient number of basic frequencies $f_i$, any signal which may have to be transmitted by device 300 may be approximated by a weighted sum of signals $S_1$ to $S_n$.

According to a first aspect, digital processor 104 is configured, for example, by means of adapted software, to calculate coefficients $a_1$ to $a_n$ so that the weighted sum of basic signals $S_i$ of the range corresponds to the radio frequency signal which is desired to be transmitted or, in other words, to decompose the signal to be transmitted into a weighted sum of basic signals $S_i$ of the range.

In the specific case where signals $S_1$ to $S_n$ are sinusoidal signals, the decomposition is a Fourier series decomposition. Weighting coefficients $a_i$ may be determined by calculation by digital processing unit 104, by means of mathematical formulas, by taking into account the data to be transmitted, the frequency of the carrier wave(s) to be transmitted, and the type of modulation used.

In the case where signals $S_1$ to $S_n$ have a shape other than sinusoidal, for example, a square shape, weighting coefficients $a_1$ to $a_n$ may be calculated by digital processing unit 104 either directly, by means of mathematical decomposition formulas, or, if such formulas cannot be easily determined, by means of an iterative method of minimization of the error function between the signal to be transmitted and the decomposition into the series of basic signals. As an example, it may be provided, in an initial step, to use as weighting coefficients the coefficients of the Fourier series decomposition of the signal to be transmitted, and then to iteratively adjust the coefficients to minimize the error between the weighted sum of the basic signals and the signal which is effectively desired to be transmitted.

In practice, the decomposition of the signal to be transmitted may be calculated by successive time windows, for example, windows having a duration ranging between a few microseconds and a few hundreds of microseconds, for example, between 10 and 200 microseconds. To accelerate the processing, it may be provided to implement the decomposition calculation on a sliding window, that is, between two successive steps of calculation of the weighting coefficients, the processing window is offset by a number of samples smaller than its total width.

Number n of basic signals $S_i$ of the range preferably ranges between 5 and 20, and each signal $S_i$ has a frequency $f_i$ equal to half frequency $f_{i-1}$ of signal $S_{i-1}$ of previous rank. Frequency $f_1$ of signal $S_1$, provided by generator $302_1$ having the lowest rank, is preferably selected to be at least ten times greater than the highest carrier frequency on which the device should be able to transmit. Frequency $f_1$ is for example on the order of 60 GHz for mobile telephony applications. The described embodiments are not however limited to the described examples, and it will be within the abilities of those skilled in the art to provide other adapted choices for the basic signal range. Anyway, at least part of basic signals $S_i$ of the range have a frequency $f_i$ greater than the highest carrier frequency at which the device is capable of transmitting.

An advantage of the transmit device described in relation with FIG. 3 is that, in case of a modification of one or several transmission standards (carrier frequency, modulation type, etc.), the device can easily be reconfigured, for example, by simple software reprogramming, to be made compatible with the new standard(s).

Another advantage is that the determination of the n weighting coefficients $a_i$ corresponding to the radio frequency signal to be transmitted only requires a lower calculation power, and in particular does not require generating a full digital version of the radio frequency signal to be transmitted.

Another advantage is that the selection of the hardware components provided between digital processor 104 and power amplifier 112 (and the selection of generators $302_i$ in the example of FIG. 3) is independent from the number of communication standards with which device 300 should be able to transmit. Thus, a transmission chain provided to transmit in a large number of standards will not be more bulky, expensive, or power consuming than a transmit chain provided to transmit in a single standard.

Figure 4:
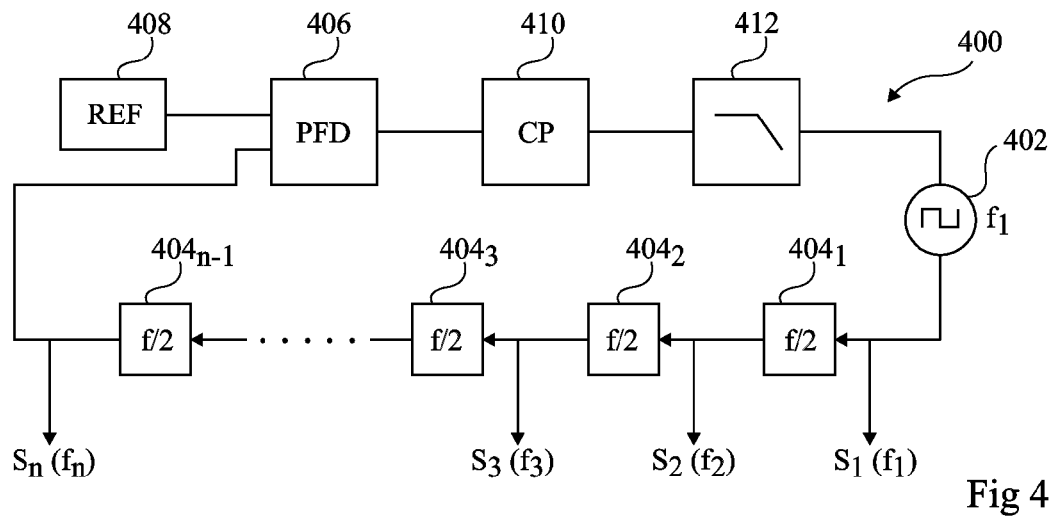
FIG. 4 is a block diagram illustrating the operation of an embodiment of a generator of analog periodic signals.

FIG. 4 illustrates a preferred embodiment where a single generator 400 is used to provide all the basic signals $S_1$ to $S_n$ of the range. FIG. 4 is a block diagram illustrating an embodiment of such a generator.

Generator 400 comprises a voltage-controlled oscillator 402, providing a periodic analog signal $S_1$ of frequency $f_1$, for example, a square signal at 60 GHz. Generator 400 further comprises n−1 frequency dividers, bearing references $404_1$ to $404_{n-1}$ in the drawing. Dividers $404_1$ to $404_n$ are series-connected, first divider $404_1$ of the series receiving signal $S_1$ as an input. Each divider $404_i$ delivers a signal $S_{i+1}$, for example, square, having a frequency $f_{i+1}$ equal to half frequency $f_i$ of signal $S_i$ that it receives. Oscillator 402 is for example controlled by a signal provided by a reference source which may comprise a quartz. In the shown example, oscillator 402 and dividers $404_1$ to $404_{n-1}$ are assembled in a phase-locked loop comprising a phase comparator 406 (PFD—Phase Frequency Detector) receiving, on the one hand, signal $S_n$ provided by last divider $404_{n-1}$ of the series and, on the other hand, a reference signal provided by a reference source 408 (REF) comprising a quartz. In this example, the output of phase comparator 406 is connected to the input of a charge pump 410 (CP), and the signal provided by charge pump 410 passes through a loop filter 412 having its output connected to the voltage control input of oscillator 402. In operation, basic analog signals $S_1$ to $S_n$ are respectively available at the output of oscillator 402 and at the output of frequency dividers $404_1$ to $404_{n-1}$.

An advantage of the embodiment of FIG. 4 is that all the basic signals $S_i$ in the range are generated by using a single voltage-controlled oscillator, and a single phase-locked loop, which decreases the bulk, the cost, and the power consumption of the transmit device.

It will be within the abilities of those skilled in the art to adapt the generator described in relation with FIG. 4 to obtain other ranges of basic signals $S_i$, for example, by varying the division ratios of frequency dividers $404_i$.

Figure 5:
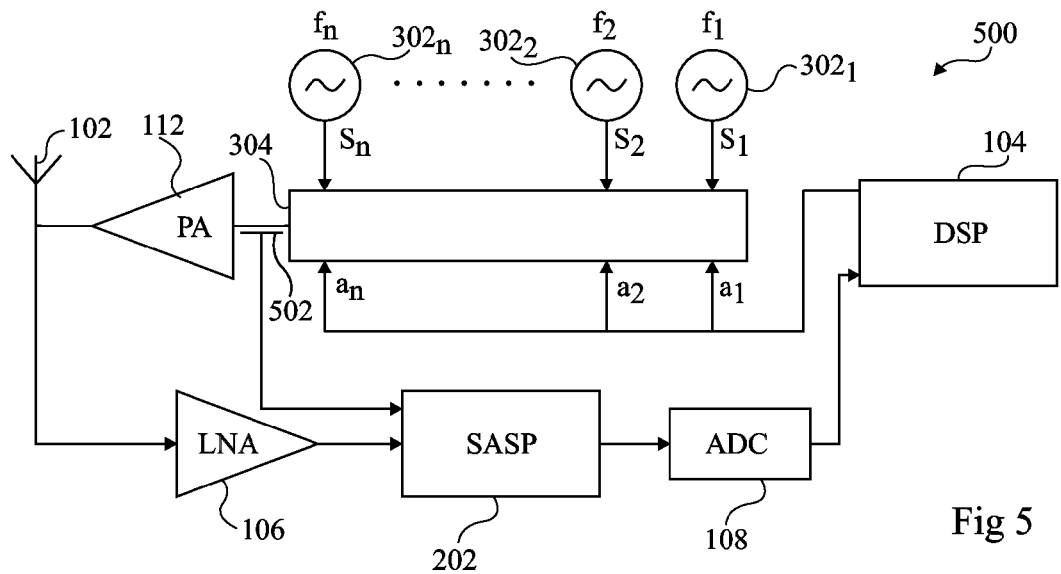
FIG. 5 is a simplified block diagram illustrating an embodiment of a radio frequency signal transceiver device.

FIG. 5 is a simplified block diagram illustrating an embodiment of a radio frequency transmit/receive device 500, this device comprising control circuits for verifying the integrity of the signals that it transmits over the network.

Device 500 comprises a transmit chain of the type described in relation with FIGS. 3 and 4, that is, where the transmitted signal is generated by weighted summing of a plurality of analog periodic basic signals $S_i$, the weighting coefficients being determined by means of a digital processor. In the shown example, the transmit chain of device 500 comprises the same elements as transmit chain 300 of FIG. 3. Device 500 further comprises a receive chain of the type described in relation with FIG. 2, that is, comprising a pre-processor for processing analog samples of the signal, capable of selecting one or several frequency envelope(s) of the radio frequency signal received by the antenna and of lowering the frequency of the signal contained in these envelope(s). In the shown example, the receive chain of device 500 comprises the same elements as the receive chain of device 200 of FIG. 2.

In the embodiment of FIG. 5, when device 500 operates in transmission mode, a signal representative of the signal transmitted by antenna 102 is sampled from the transmit chain, processed by analog pre-processor 202 (SASP) of the receive chain, and sent to digital processor 104, which verifies its integrity. In the shown example, a portion of the output signal of circuit 304 (that is, the weighted sum of analog basic signals $S_i$) is sampled via a coupler 502, and sent to analog pre-processing device 202. As previously discussed in relation with FIG. 2, device 202 comprises a sampling circuit capable of delivering analog samples of an input signal, and a processing circuit capable of performing a discrete Fourier transform processing on the signal samples. It is provided, when device 500 operates in transmission mode, to activate device 202 to calculate the discrete Fourier transform of the signal provided by coupler 502. The discrete Fourier transform signal generated by device 202 is then digitized by converter 108, and then sent to digital processor 104. Device 104 is configured, for example, by means of an adapted software, to verify that the received Fourier transform signal is coherent with the previously-calculated decomposition into periodic basic signals $S_i$.

An advantage of the transceiver device of FIG. 5 is that it enables to verify the integrity of the signal transmitted by antenna 102 without requiring, for this purpose, providing a specific counter-feedback loop of the type described in relation with FIG. 2. This enables to decrease the bulk, the cost, and the power consumption with respect to the device of FIG. 2.

Another advantage of device 500 is that, in case one or several communication standards have been modified, it may easily be made compatible with the new standard(s). In particular, the function of verification of the integrity of the transmitted signal requires no specific update or reconfiguration to operate with new transmission standards.

Figure 6:
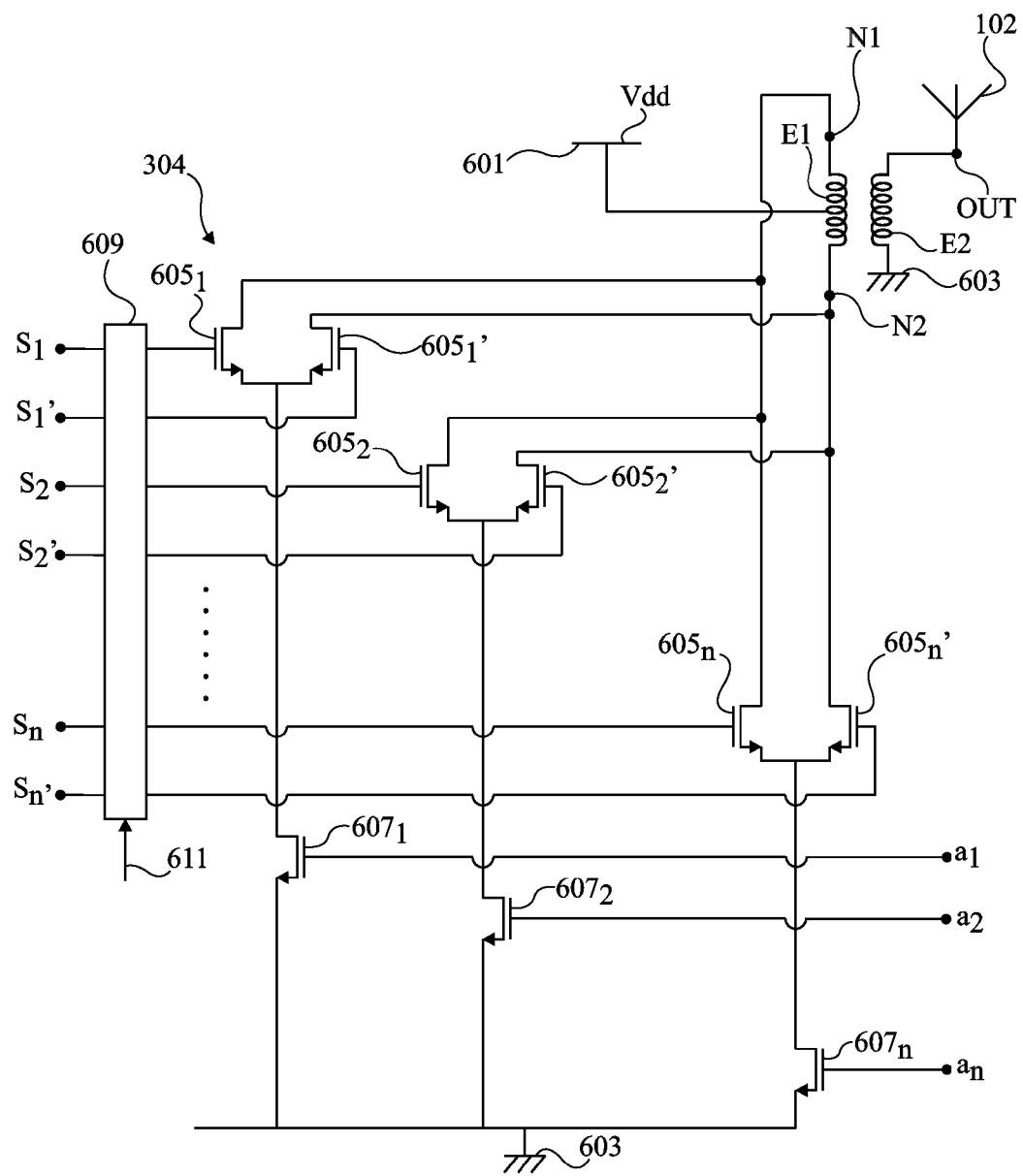
FIG. 6 is an electric diagram of an embodiment of a device capable of summing up periodic analog input signals by assigning a weighting coefficient to each of them.

FIG. 6 is an electric diagram illustrating an embodiment of a circuit 304 according to the second aspect, capable of summing up a plurality of analog periodic input signals $S_i$ by assigning a weighting coefficient $a_i$ to each of them. Circuit 304 of FIG. 6 may for example be used as a weighted summing circuit in the radio frequency transmit devices of FIGS. 3 and 5.

Circuit 304 comprises a high power supply terminal or line 601 ($V_{dd}$) and a low power supply terminal or line 603 (or ground terminal). It further comprises n inputs $S_1$ to $S_n$ intended to respectively receive n periodic analog signals to be summed up and n inputs $S_{1'}$ to $S_{n'}$ intended to respectively receive the complementaries of the signals to be summed up, that is, signals having the same characteristics as the signals to be summed up, with a 180° phase shift. Circuit 304 comprises a balun comprising two conductive windings E1 and E2 coupled to each other. The ends of winding E1 define differential access terminals N1 and N2, an intermediate point of winding E1 being connected to a reference terminal, for example, high power supply terminal 601. The ends of common-mode winding E2 are respectively connected to an output terminal OUT and to a reference terminal, for example, low power supply terminal 603. Circuit 304 further comprises, associated with each of input terminals $S_i$, a switch $605_i$, and a variable current source $607_i$. A first conduction electrode of switch $605_i$ is connected to node N1, and the second conduction electrode of switch $605_i$ is connected to low power supply terminal 603 via variable current source $607_i$. The control terminal of switch $605_i$ is connected to input terminal $S_i$. In the example of FIG. 6, switch $605_i$ is an N-channel channel MOS transistor having its drain connected to node N1 and having its gate connected to terminal $S_i$, and current source $607_i$ is an N-channel MOS transistor having its source and its drain respectively connected to low power supply terminal 603 and to the source of transistor $605_i$. Circuit 304 further comprises, associated with each of input terminals $S_{i'}$, a switch $605_{i'}$ having a first conduction electrode connected to node N2 and having its second conduction electrode connected to the second conduction electrode of switch $605_i$. The control terminal of switch $605_{i'}$ is connected to input terminal $S_{i'}$. In the example of FIG. 6, switch $605_{i'}$ is an N-channel MOS transistor having its drain connected to node N2, its gate connected to terminal $S_{i'}$, and its source connected to the source of transistor $605_i$. Circuit 304 further comprises n inputs $a_1$ to $a_n$ intended to receive voltage references proportional to the absolute values of the weighting coefficients to be applied to the signals to be summed up. Inputs $a_1$ to $a_n$ are successively connected to the control terminals of variable current sources $607_1$ to $607_n$, that is, to the gates of N-channel MOS transistors $607_1$ à $607_n$ in the shown example.

In operation, input terminals $S_1$ to $S_n$ and $S_{1'}$ to $S_{n'}$ receive the signals to be summed up and their complementaries, and input terminals $a_1$ to $a_n$ receive voltage references proportional to the absolute values of the weighting coefficients to be applied to the signals to be summed up. As an example, in the case where circuit 304 is used in a radio frequency transmission circuit of the type described in relation with FIGS. 3 and 5, the references to be applied to terminals $a_1$ to $a_n$ are digitally determined by digital processor 104, and digital-to-analog converters, not shown, convert the digital reference values into analog values applicable to terminals $a_1$ to $a_n$. To take into account, in the weighted sum, the sign of the weighting coefficients, the fact of having, at the input, not only basic signals $S_i$ to be summed up, but also their complementaries $S_{i'}$, is used. When the coefficient to be applied to a given input signal $S_i$ is negative, the complementary signal $S_{i'}$ to which the absolute value of the weighting coefficient is applied is used to generate the corresponding term of the weighted sum. To achieve this, between input terminals $S_i$ and $S_{i'}$, on the one hand, and the control terminals of switches $605_i$ and $605_{i'}$ on the other hand, a circuit 609 configured to activate terminal $S_i$ and deactivate $S_{i'}$ is provided when coefficient $a_i$ to be applied has a positive sign, and to deactivate terminal $S_i$ and activate terminal $S_{i'}$ when coefficient $a_i$ to be applied has a negative sign. Circuit 609 comprises an input 611 for receiving the sign information of coefficients $a_i$, for example, from digital processor 104 in the case where circuit 304 is used in a radio frequency transmission circuit of the type described in relation with FIGS. 3 and 5. If the coefficient to be applied to a given input signal $S_i$ is positive, switch $605_{i'}$ connected to the corresponding complementary input $S_{i'}$ is deactivated, that is, it is forced to the off state by circuit 609, and switch $605_i$ remains active, that is, its state is a function of the state of signal $S_i$. If the coefficient to be applied to a given input signal $S_i$ is negative, switch $605_i$ connected to input $S_i$ is deactivated (forced to the off state by circuit 609) and switch $605_{i'}$ remains active (state depending on the state of complementary signal $S_{i'}$).

Input signals $S_i$ and $S_{i'}$ being periodic A.C. signals (for example, sinusoidal or square signals), active switches $605_i$ or $605_{i'}$ (according to whether the sign of weighting coefficient $a_i$ is positive or negative) periodically switch from an on state to an off state. In the case of a positive weighting coefficient $a_i$ (switch $605_i$ active), when switch $605_i$ is conductive (high state of input signal $S_i$), a current flows from high power supply terminal 601 to low power supply terminal 603, through the portion of winding E1 located between terminal 601 and node N1, through switch $605_i$, and through current source $607_i$. The magnitude of this current depends on the voltage applied to control terminal $a_i$ of variable voltage source $607_i$. When switch $605_i$ is non-conductive (low state of input signal $S_i$), this current stops. In the case of a negative weighting coefficient $a_i$ (switch $605_{i'}$ active), when switch $605_{i'}$ is conductive (high state of input signal $S_{i'}$), a current flows from high power supply terminal 601 to low power supply terminal 603, through the portion of winding E1 located between terminal 601 and node N2, through switch 605$_{i'}$, and through current source 607$_i$. The magnitude of this current depends on the voltage applied to control terminal $a_i$ of variable voltage source 607$_i$. When switch 605$_{i'}$ is non-conductive (low state of input signal $S_{i'}$), this current stops.

The currents provided by current sources 607$_i$ add at the level of nodes N1 (for positive weighting coefficients $a_i$) and N2 (for negative weighting coefficients $a_i$). The current which flows through winding E1 is representative of the sum of input signals $S_i$ weighted by coefficients $a_i$. This current is copied, by inductive coupling, on winding E2. The voltage variation across winding E2 is thus representative of the weighted sum of input signals $S_i$.

In the case where circuit 304 is used in a transmit circuit of the type described in relation with FIGS. 3 and 5, node OUT may be connected to a transmit antenna 102. If transistors 605$_i$, 605$_{i'}$, 607$_i$ and windings E1 and E2 are properly sized, it may advantageously be done without a power amplifier between the output of circuit 304 and antenna 102.

An advantage of circuit 304 is that it is easy to form and enables to efficiently perform a weighted summing of periodic A.C. input signals.

The embodiments described in relation with FIG. 6 are not limited to the case where the transistors used to form switches 605$_i$, 605$_{i'}$, and 607$_i$ are N-channel MOS transistors. It will be within the abilities of those skilled in the art to implement the desired operation by using P-channel MOS transistors and by inverting, if need be, the biasing of the circuit power supply terminals.

Further, the embodiments described in relation with FIG. 6 are not limited to a use of circuit 304 in a radio frequency signal transmit device of the type described in relation with FIGS. 3 and 5. Such a circuit may also be used in any other application requiring the implementation of a weighted sum of periodic analog signals.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for generating a signal, comprising:
   a balun; and
   a circuit configured to sum up, on a first access terminal of the balun, currents representative of signals received on first input terminals of the device, and on a second access terminal of the balun, currents representative of signals received on second input terminals of the device;
   the first input terminals are configured to receive first periodic analog signals having different frequencies, and the second input terminals are configured to receive second periodic analog signals having different frequencies, with the second periodic analog signals having phases opposite phases of the first periodic analog signals;
   with said circuit configured to perform a weighted sum of each of the first and second periodic analog signals based on assigned weighting coefficients.

2. The device of claim 1, wherein said circuit comprises a plurality of parallel branches, each comprising a controllable current source and a pair of switches, connecting said current source respectively to the first and second access terminals of the balun.

3. The device of claim 2, further comprising a selection circuit configured so that two switches of a same pair are not simultaneously controlled.

4. The device of claim 3, wherein the switches of each pair are respectively connected, via the selection circuit, to one of the first input terminals of the device, and to one of the second input terminals of the device.

5. The device of claim 2, comprising a plurality of third input terminals respectively connected to the control terminals of said controllable current sources.

6. The device of claim 5, wherein said third input terminals are intended to receive voltages representative of the assigned weighting coefficients to be applied to said currents representative of the signals received on the first and second input terminals.

7. The device of claim 1, wherein the balun comprises a first winding between the first and second access terminals, an intermediate point of the first winding being connected to a reference voltage terminal.

8. The device of claim 7, wherein the balun further comprises a second winding between an output terminal of the device and a reference voltage terminal.

9. The device of claim 1, capable of generating a radio frequency signal.

* * * * *